US010612262B2

(12) United States Patent
Katanoda (10) Patent No.: US 10,612,262 B2
(45) Date of Patent: Apr. 7, 2020

(54) CONTACTLESS CHARGING SYSTEM FOR CHARGING AT PARKING SPACES AND CHARGING STATION FOR CHARGING AT PARKING SPACES

(71) Applicant: Toyota Jidosha Kabushiki Kaisha, Toyota-shi, Aichi-ken (JP)

(72) Inventor: Tomoya Katanoda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 171 days.

(21) Appl. No.: 15/676,382

(22) Filed: Aug. 14, 2017

(65) Prior Publication Data

US 2018/0058085 A1 Mar. 1, 2018

(30) Foreign Application Priority Data

Aug. 25, 2016 (JP) ................. 2016-164741

(51) Int. Cl.
*E04H 6/42* (2006.01)
*B60L 53/65* (2019.01)
*B60L 53/12* (2019.01)
*B60L 53/30* (2019.01)
*B60L 53/38* (2019.01)
(Continued)

(52) U.S. Cl.
CPC ............ *E04H 6/42* (2013.01); *B60L 53/12* (2019.02); *B60L 53/30* (2019.02); *B60L 53/305* (2019.02); *B60L 53/38* (2019.02); *B60L 53/65* (2019.02); *E01F 13/042* (2013.01); *E01F 13/046* (2013.01); *G06Q 50/30* (2013.01); *H02J 50/10* (2016.02); *Y02T 10/7005* (2013.01);
(Continued)

(58) Field of Classification Search
CPC .......... E04H 6/42; B60L 53/305; B60L 53/30; B60L 53/12; B60L 53/65; B60L 53/38; B60L 53/36; E01F 13/042; E01F 13/046; Y02T 90/14; Y02T 90/122; Y02T 10/7072; Y02T 10/7005; H02J 50/10; B60Y 2200/92; B60Y 2200/91; G06Q 50/30
USPC .................................................. 320/108, 109
See application file for complete search history.

(56) References Cited

U.S. PATENT DOCUMENTS

2011/0127944 A1\* 6/2011 Saito ..................... H01M 10/44
320/101
2011/0227533 A1 9/2011 Wolfien
(Continued)

FOREIGN PATENT DOCUMENTS

CN 105429254 A 3/2016
JP 2012-160010 A 8/2012
(Continued)

*Primary Examiner* — Richard Isla
*Assistant Examiner* — Manuel Hernandez
(74) *Attorney, Agent, or Firm* — Dinsmore & Shohl LLP (57) ABSTRACT

A contactless charging system includes a target vehicle and a charging station. The charging station includes a power transmission device, at least one parking space, a restriction device, and a management device. The management device is configured to control the restriction device to be a second state in which the target vehicle is permitted to enter the charging station and the parking space when the target vehicle is the contactless charged vehicle, and to be a first state in which the target vehicle is restricted to enter the charging station or the parking space when the target vehicle is not the contactless charged vehicle.

4 Claims, 5 Drawing Sheets

(51) Int. Cl.
*E01F 13/04* (2006.01)
*H02J 50/10* (2016.01)
*G06Q 50/30* (2012.01)

(52) U.S. Cl.
CPC .......... *Y02T 10/7072* (2013.01); *Y02T 90/122* (2013.01); *Y02T 90/14* (2013.01)

(56) References Cited

U.S. PATENT DOCUMENTS

| | | | | |
|---|---|---|---|---|
| 2012/0236149 | A1* | 9/2012 | Nagy | E04H 6/426 348/148 |
| 2014/0012448 | A1* | 1/2014 | Tripathi | G05D 1/0276 701/22 |
| 2017/0120765 | A1* | 5/2017 | Ichikawa | B60L 53/305 |
| 2017/0274789 | A1* | 9/2017 | Ma | B60L 53/65 |

FOREIGN PATENT DOCUMENTS

| | | |
|---|---|---|
| JP | 2013-225969 A | 10/2013 |
| KR | 20130106028 A | 9/2013 |
| WO | 2010/119508 A1 | 10/2010 |

* cited by examiner

CONTACTLESS CHARGING SYSTEM FOR CHARGING AT PARKING SPACES AND CHARGING STATION FOR CHARGING AT PARKING SPACES

CROSS-REFERENCE TO RELATED APPLICATIONS

This application claims priority to Japanese Patent Application No. 2016-164741 filed on Aug. 25, 2016, which is incorporated herein by reference in its entirety including the specification, drawings and abstract.

BACKGROUND

1. Field

The present disclosure relates to a contactless charging system, a charging station, and a contactless charged vehicle.

2. Description of Related Art

In Japanese Patent Application Publication No. 2013-225969 (JP 2013-225969 A), a contactless charging system (a power transmission system) is disclosed. The contactless charging system includes: an electric vehicle that can receive power to charge an in-vehicle battery from outside of the vehicle without contact (hereinafter also referred to as a "contactless charged vehicle"); and a charging station that has a power transmission device capable of transmitting the power to the contactless charged vehicle without contact (hereinafter also referred to as a "contactless power transmission device"). The charging station includes: plural parking spaces where the contactless power transmission devices are respectively arranged; an entrance gate that regulates entry of the vehicles to the charging station; and a management device that controls the entrance gate. When detecting the vehicle that attempts to enter the charging station (hereinafter also referred to as a "target vehicle"), the management device assigns one of empty parking spaces to the target vehicle. Then, after notifying the target vehicle of the assigned parking space, the management device opens the entrance gate to permit the entry of the target vehicle. In the contactless charging system disclosed in JP 2013-225969 A, it is not confirmed whether the target vehicle is the contactless charged vehicle.

SUMMARY

With the contactless charging system mentioned above, even when the vehicle cannot be charged in a contactless manner (hereinafter also referred to as a "normal vehicle"), the entrance gate is possibly opened, and the entry thereof to the charging station is possibly permitted. Thus, it is concerned that the parking spaces in the charging station are occupied by the normal vehicles, and consequently, the contactless power transmission devices provided in the parking spaces cannot be used for the contactless charged vehicles. In addition, differing from contact charging with a cable, it is impossible to externally confirm whether the vehicle is charged in the contactless charging. Thus, it is difficult to alert a driver of the normal vehicle that is not charged to move the normal vehicle. Because the number of the contactless charged vehicles is expected to further increase in the future, a technique of efficiently using the parking spaces where the contactless power transmission devices are arranged is necessary.

The present disclosure provides a contactless charging system, a charging station, and a contactless charged vehicle capable of efficiently using a parking space where a contactless power transmission device is arranged.

A first aspect of the present disclosure provides a contactless charging system. The contactless charging system includes a target vehicle and a charging station. The target vehicle includes a contactless charged vehicle configured to receive power without contact. The target vehicle is a vehicle that attempts to be parked in the charging station. The charging station includes a power transmission device, at least one parking space, a restriction device, and a management device. The power transmission device is configured to transmit the power to the contactless charged vehicle without contact. The power transmission device is arranged in the at least one parking space. The restriction device is configured to be switched between a first state and a second state. The first state is a state of restricting entry of the target vehicle to one of the charging station and the parking space. The second state is a state of permitting the entry of the target vehicle to the charging station and the parking space. The management device is configured to control the restriction device. The management device is configured to control the restriction device to be the second state when the target vehicle is the contactless charged vehicle. The management device is configured to control the restriction device to be the first state when the target vehicle is a vehicle other than the contactless charged vehicle.

With this configuration, when the target vehicle is a normal vehicle that is not the contactless charged vehicle, the management device brings the restriction device into the first state. Accordingly, the entry of the normal vehicle to the charging station or the parking space is restricted. In this way, the parking space where the contactless power transmission device is arranged can be used by the contactless charged vehicle that uses the contactless power transmission device instead of the normal vehicle that does not use the contactless power transmission device. As a result, the parking space where the contactless power transmission device is arranged can efficiently be used.

In the contactless charging system, the at least one parking space may include a plurality of parking spaces. The restriction device may be provided for each of the plurality of parking spaces. The management device may be configured to assign one of empty parking spaces among the plurality of parking spaces to the target vehicle when the target vehicle is the contactless charged vehicle. The management device may be configured to control the restriction device provided in the parking space assigned to the target vehicle to be the second state. The management device may be configured to control the restriction device provided in the parking space other than the parking space assigned to the target vehicle among the empty parking spaces to be the first state.

With this configuration, when the target vehicle is the contactless charged vehicle, the management device brings the restriction device provided in the parking space assigned to the target vehicle among the empty parking spaces into the second state and brings the restriction device provided in rest of the empty parking spaces into the first state. Accordingly, the target vehicle is only permitted to enter the assigned parking space among the empty parking spaces and is restricted from entering the other parking spaces. In this way, the contactless charged vehicle can appropriately be parked in the assigned parking space.

In the contactless charging system, the management device may be configured to receive information that is used to predict a parking use rate as a ratio of the used spaces to the total parking spaces from a server located on outside of the charging station. The management device may be configured to control the restriction device to be the second state regardless of whether the target vehicle is the contactless charged vehicle when the management device determines that the parking use rate predicated in accordance with the information from the server is lower than a predetermined value.

With this configuration, the management device receives the information (for example, a rate of the contactless charging vehicles and the normal vehicles that travel in a peripheral area of the charging station) that is used to predict the parking use rate from the external server. Then, when the parking use rate that is predicted in accordance with the information received from the external server is lower than the predetermined value, the management device brings the restriction device into the second state regardless of whether the target vehicle is the contactless charged vehicle. In this way, when it is predicted that a possibility of the empty space being used by the contactless charged vehicle in the future is low, in addition to the contactless charged vehicle, the normal vehicle can also use the empty space. As a result, the parking space in the charging station can further efficiently be used.

A second aspect of the present disclosure provides a charging station. The charging station includes a power transmission device, at least one parking space, a restriction device, and a management device. The power transmission device is configured to transmit power to a contactless charged vehicle without contact. The power transmission device is arranged in the at least one parking space. The restriction device is configured to be switched between a first state and a second state. The first state is a state of restricting entry of a target vehicle to one of the charging station and the parking space. The second state is a state of permitting the entry of the target vehicle to the charging station and the parking space. The target vehicle is a vehicle that attempts to be parked in the at least one parking space. The management device is configured to control the restriction device. The management device is configured to control the restriction device to be the second state when the target vehicle is the contactless charged vehicle. The management device is configured to control the restriction device to be the first state when the target vehicle is a vehicle other than the contactless charged vehicle. With this charging station, similar to the above-described contactless charging system, the parking space where the contactless power transmission device is arranged can efficiently be used.

A third aspect of the present disclosure provides a contactless charged vehicle. The contactless charged vehicle is configured to receive power from a charging station without contact. The charging station includes a plurality of parking spaces, a plurality of restriction devices, and a management device. The plurality of parking spaces respectively includes power a transmission device. The power transmission device is configured to transmit the power without contact. The plurality of restriction devices are respectively provided for the plurality of parking spaces. The plurality of restriction devices is configured to restrict entry of a vehicle to the parking spaces, respectively. The management device is configured to transmit information on an empty parking space to the contactless charged vehicle. The management device is configured to cancel entry restriction by the restriction device provided in the parking space selected by the contactless charged vehicle. The contactless charged vehicle includes a controller and a communication device. The controller is configured to select one of the empty parking spaces based on the information received from the management device. The communication device is configured to transmit a signal to request cancellation of the entry restriction of the selected one of the empty parking spaces by the restriction device to the management device.

With this configuration, the contactless charged vehicle transmits the signal to request the cancellation of the entry restriction of the selected one of the empty parking space by the restriction device to the management device of the charging station, the space being selected by using the information received from the management device of the charging station (for example, a location of each of the empty parking spaces, maximum transmission power, a charging fee per unit time, and the like). In this way, the entry restriction by the restriction device, which is provided in the parking space selected by the contactless charged vehicle, is cancelled by the management device of the charging station. Therefore, the contactless charged vehicle can appropriately be parked in the selected parking space.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A detailed description will hereinafter be made on embodiments of the present disclosure with reference to the drawings. Note that the same or corresponding portions in the drawings are denoted by the same reference numeral and the description thereon will not be repeated.

Figure 1:
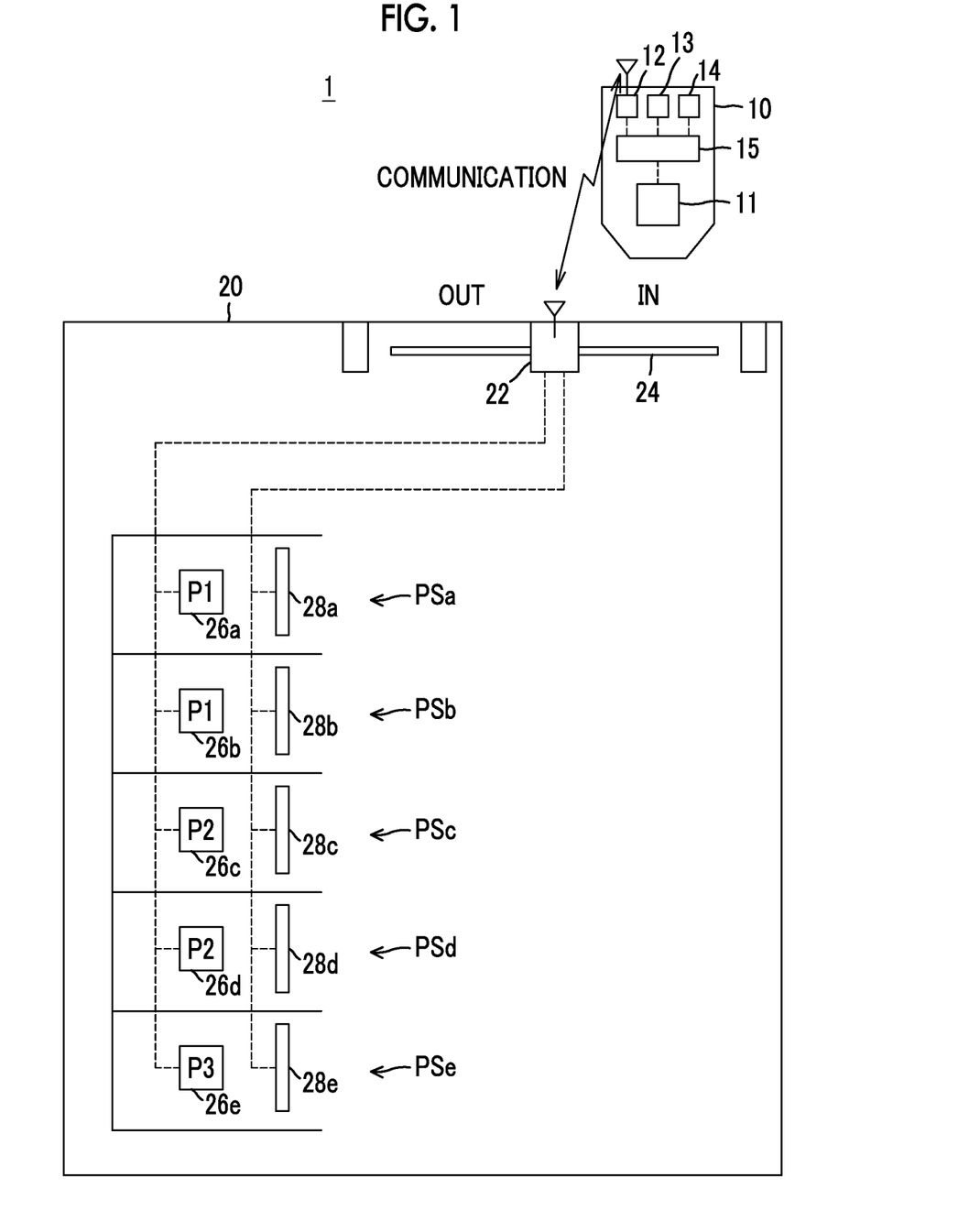
FIG. 1 is a schematic view of an overall configuration of a contactless charging system according to a first embodiment.

FIG. 1 is a schematic view of an overall configuration of a contactless charging system 1 according to a first embodiment. The contactless charging system 1 includes a contactless charged vehicle 10 and a charging station 20. The contactless charged vehicle 10 includes a power receiving device 11, a communication device 12, a navigation device 13, a human-machine interface (HMI) device 14, and a controller 15. The charging station 20 includes a management device 22, an entrance gate 24, and a plurality of (five in an example shown in FIG. 1) parking spaces PSa to PSe. The parking spaces PSa to PSe are respectively provided with power transmission devices 26a to 26e and entry prevention plates 28a to 28e. Each of the entry prevention plates 28a to 28e is one example of a restriction device.

The contactless charged vehicle 10 is an electric vehicle (a hybrid vehicle, an electric automobile, or the like) on which a drive motor and a drive battery (neither of them is shown) are mounted. The contactless charged vehicle 10 is configured to be able to receive power to charge the drive battery from outside of the vehicle without contact. The contactless charged vehicle 10 is configured to be able to execute processing of charging the drive battery by the power received from outside of the vehicle without contact (hereinafter also referred to as "contactless charging"). Note that the contactless charged vehicle 10 is an example of the contactless charged vehicles.

The power receiving device 11 is provided on a bottom surface of a vehicle body and, in a state where the contactless charged vehicle 10 is parked at any of the parking spaces PSa to PSe in the charging station 20, the power receiving device 11 is configured to be able to receive power output from the power transmission device (any of the power transmission devices 26a to 26e), which is provided at the parking space the contactless charged vehicle 10 is parked, without contact. As a technique of contactless (wireless) power transmission/reception, power transmission/reception using electromagnetic induction, power transmission/reception using microwaves, power transmission/reception by a resonance method, and the like have widely been known. In regard to the power transmission/reception by the resonance method, a primary-side (power-transmission side) coil and a secondary-side (power-reception side) coil are resonated in an electromagnetic field, and the power is thereby transmitted/received via the electromagnetic field. In some embodiments, when the power is transmitted/received by the resonance method, a Q value that represents a degree of resonance intensity of each of the power transmission devices 26a to 26e (the primary-side coil) in the charging station 20 and a Q value that represents a degree of resonance intensity of the power receiving device 11 (the secondary-side coil) in the contactless charged vehicle 10 are equal to or larger than 100.

The maximum received power by the power receiving device 11 is, for example, set to any of a predetermined value P1 (for example, about 3 kW), a predetermined value P2 (for example, about 6 kW) that is higher than the predetermined value P1, and a predetermined value P3 (for example, about 9 kW) that is higher than the predetermined value P2. In other words, there exist the contactless charged vehicles 10, the maximum received power of which is set to the predetermined value P1, the maximum received power of which is set to the predetermined value P2, and the maximum received power of which is set to the predetermined value P3.

The communication device 12 is configured to be wirelessly communicable with the management device 22 of the charging station 20. The communication device 12 is connected to the controller 15 by a communication line, transmits information transmitted from the controller 15 to the management device 22 of the charging station 20, and transmits information received from the management device 22 of the charging station 20 to the controller 15.

The navigation device 13 includes a global positioning system (GPS) and a map database. The navigation device 13 outputs own vehicle location information measured by the GPS and map data to the controller 15.

The HMI device 14 is a device that provides a user with various types of information to assist an operation of the contactless charged vehicle 10. For example, the HMI device 14 includes a display, a speaker, and the like that are provided in a cabin. Note that a display and a speaker of the navigation device 13 may be used for the HMI device 14, for example.

The controller (an electronic control unit) 15 includes a central processing unit (CPU) and memory, which are not shown, and executes specified arithmetic processing on the basis of information stored in the memory and information from each sensor. Based on a result of the arithmetic processing, the controller 15 controls various equipment such as the power receiving device 11, the communication device 12, and the human-machine interface (HMI) device 14.

The charging station 20 is a facility that includes the parking spaces for the contactless charging of the contactless charged vehicle 10. As described above, the charging station 20 is provided with the management device 22, the entrance gate 24, and the plurality of parking spaces PSa to PSe. The parking spaces PSa to PSe are respectively provided with the power transmission devices 26a to 26e and the entry prevention plates 28a to 28e.

The management device 22 includes a central processing unit (CPU) and memory, which are not shown, and executes specified arithmetic processing. The management device 22 performs various types of the processing and management in the charging station 20, which include receiving an entry request operation by a user, managing usage, computing fees (a parking fee and an electric rate), and the like.

The management device 22 is provided near an entrance and an exit of the charging station 20. The management device 22 is configured to be wirelessly communicable with the communication device 12 of the contactless charged vehicle 10. The management device 22 broadcasts a signal that includes information on the usage of the charging station 20 (presence or absence of the empty parking space(s)) to a specified area that includes the entrance and the exit of the charging station 20 at specified intervals. When the contactless charged vehicle 10 receives the signal broadcast by the management device 22, the contactless charged vehicle 10 can confirm the usage of the charging station 20 (the presence or absence of the empty parking space(s)).

The entrance gate 24 is a lifting-type movable bar that is installed near the entrance of the charging station 20. When the entrance gate 24 is closed, entry (an approach) of the vehicle to the charging station 20 is physically restricted. When the entrance gate 24 is opened, the entry (the approach) of the vehicle to the charging station 20 is permitted.

In this embodiment, the five parking spaces PSa to PSe are arranged in a row in this order from the nearest side to the entry of the charging station 20. Note that the number and the arrangement of the parking spaces PSa to PSe are not limited to those shown in FIG. 1. For example, the number of the parking spaces may be 6 or more or may be 4 or less (for example, 1).

Each of the power transmission devices 26a to 26e includes the primary-side coil that is connected to an AC power supply, is magnetically coupled to the power receiving device 11 (the secondary-side coil) of the contactless charged vehicle 10, and thereby supplies the power to the contactless charged vehicle 10 without contact. The power transmission devices 26a to 26e are buried in and fixed to positions near centers of road surfaces of the parking spaces PSa to PSe, respectively.

The maximum transmission power by each of the power transmission devices 26a to 26e is set to any of the predetermined values P1 to P3, so as to match the maximum received power by the contactless charged vehicle 10, which is set to any of the predetermined values P1 to P3. In the example shown in FIG. 1, the maximum transmission power of each of the power transmission devices 26a, 26b, which are respectively provided in the parking spaces PSa, PSb, is set to the predetermined value P1. The maximum transmission power of each of the power transmission devices 26c, 26d, which are respectively provided in the parking spaces PSc, PSd, is set to the predetermined value P2. The maximum transmission power of the power transmission device 26e, which is provided in the parking space PSe, is set to the predetermined value P3.

The entry prevention plates 28a to 28e are respectively installed near entries of the parking spaces PSa to PSe. Each of the entry prevention plates 28a to 28e is configured to be switchable between a restricting state (a first state) where the entry prevention plate is projected above the road surface of the parking space so as to physically restrict the entry of the vehicle and a stored state (a second state) where the entry prevention plate is stored in a space below the road surface of the parking space and thereby permits the entry of the vehicle. Note that each of the entry prevention plates 28a to 28e is usually maintained in the restricting state.

The management device 22 is connected to the entrance gate 24 by wire and controls opening/closing of the entrance gate 24. The management device 22 usually keeps the entrance gate 24 in a closed state. When receiving the entry request operation by the user, the management device 22 brings the entrance gate 24 into an opened state.

The management device 22 is connected to each of the power transmission devices 26a to 26e by wire, controls an operation of each of the power transmission devices 26a to 26e, and manages the usage thereof. The management device 22 is also connected to each of the entry prevention plates 28a to 28e by wire and controls an operation of each of the entry prevention plates 28a to 28e. Furthermore, the management device 22 uses a sensor, a camera, or the like, which is not shown, for example, to manage the usage of each of the parking spaces PSa to PSe (presence or absence of the parked vehicle).

A description will be made on efficient use of the charging station. In the contactless charging system 1 that has a configuration as described above, when use of the parking spaces provided with the power transmission devices 26a to 26e by the normal vehicles is permitted, it is concerned that the contactless charged vehicle 10 cannot use the power transmission devices 26a to 26e. As a result, a user of the contactless charged vehicle 10 loses an opportunity of the contactless charging, and a company that runs the charging station 20 loses an opportunity of collecting a contactless charging fee.

In view of the above point, the management device 22 of the charging station 20 according to this embodiment determines whether a vehicle that attempts to be parked in the charging station 20 (hereinafter also referred to as a "target vehicle") is the contactless charged vehicle 10 on the basis of a communication situation with the target vehicle.

When the target vehicle is the contactless charged vehicle 10, the management device 22 executes matching processing to assign one of the empty parking spaces (hereinafter also referred to as an "empty space") to the target vehicle. After executing the matching processing, the management device 22 controls the entry prevention plate, which is provided in the parking space assigned to the target vehicle (hereinafter also referred to as an "assigned space"), to be the stored state at specified timing. In this way, the entry of the target vehicle (the contactless charged vehicle 10) to the assigned space is permitted.

On the other hand, when the target vehicle is the normal vehicle, the management device 22 maintains the entry prevention plate, which is provided in each of the parking spaces, in the restricting state. Thus, the entry of the normal vehicle to the parking space is restricted.

In this way, the parking spaces PSa to PSe where the power transmission devices 26a to 26e are respectively arranged can be used by the contactless charged vehicle 10 that uses the power transmission devices 26a to 26e instead of the normal vehicle that does not use the power transmission devices 26a to 26e. As a result, the parking spaces PSa to PSe and the power transmission devices 26a to 26e can efficiently be used.

Figure 2:
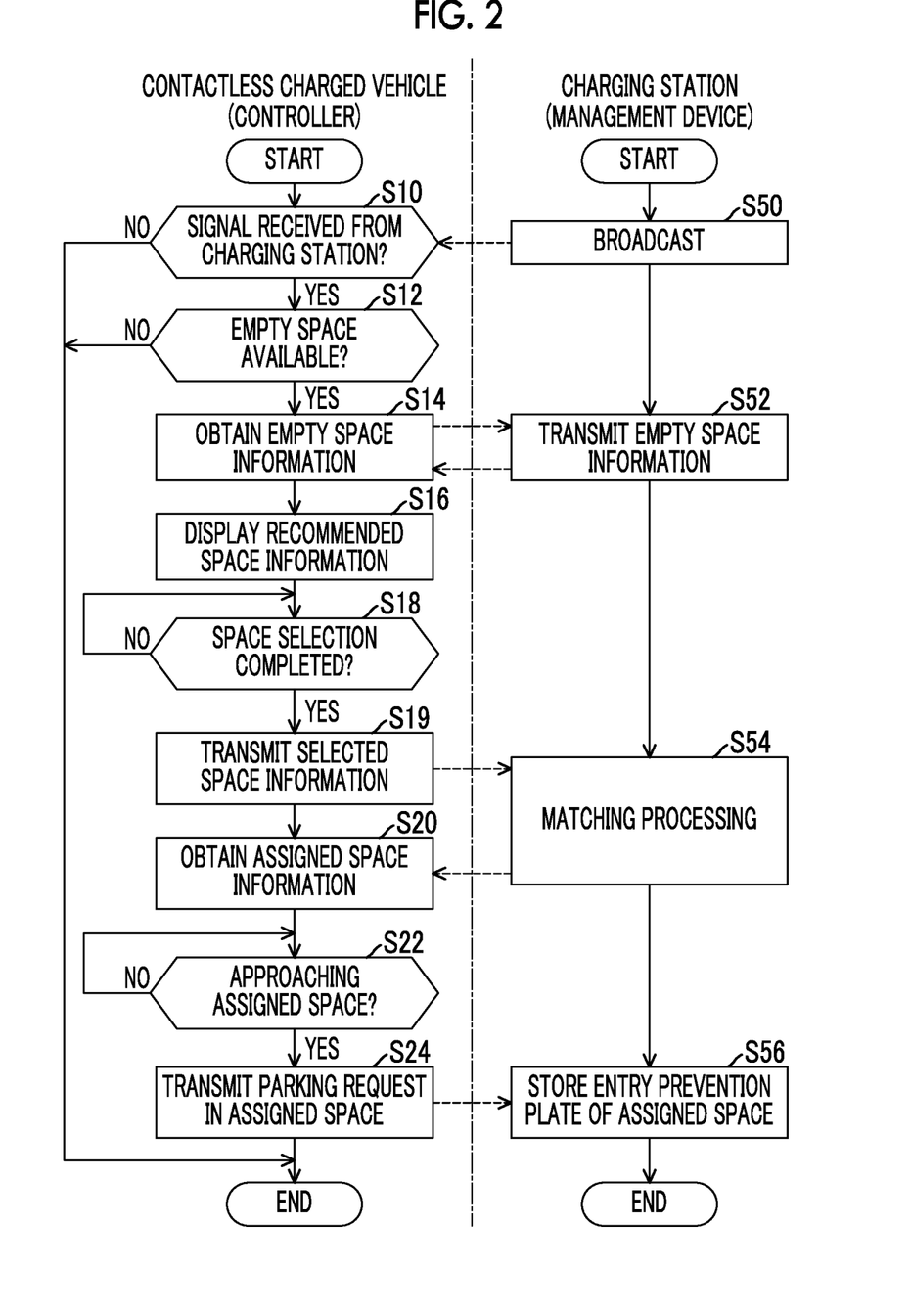
FIG. 2 is a flowchart of one example of a processing procedure executed by a contactless charged vehicle and a charging station.

FIG. 2 is a flowchart of one example of a processing procedure executed by the contactless charged vehicle 10 (the controller 15) and the charging station 20 (the management device 22) at a time when the contactless charged vehicle 10 enters the charging station 20.

First, a description will be made on the one example of the processing procedure executed by the charging station 20 (the management device 22). In step (hereinafter step will be abbreviated as "S") 50, the charging station 20 broadcasts the signal that includes the information on the usage of the charging station 20 (the presence or the absence of the empty space(s)) at the specified intervals. As will be described below, when receiving the signal broadcast by the charging station 20, the contactless charged vehicle 10 transmits a use request to the charging station 20. Note that the normal vehicle does not have a function of receiving the broadcast signal from the charging station 20 or a function of transmitting the use request to the charging station 20.

When receiving the use request from the target vehicle, the charging station 20 determines that the target vehicle is not the normal vehicle but the contactless charged vehicle 10, and transmits information on the empty space in the charging station 20 (hereinafter referred to as "empty space information") to the target vehicle (S52).

The empty space information includes information such as a guide map, on which locations of all of the empty spaces are indicated, the maximum transmission power, and the charging fee per unit time (yen/h). As will be described below, when receiving the empty space information from the charging station 20, the contactless charged vehicle 10 selects one of the empty spaces included in the empty space information and transmits information on the selected parking space (hereinafter also referred to as a "selected space") to the charging station 20.

When receiving the information on the selected space from the target vehicle, the charging station 20 assigns authentication information (authentication ID) to the target vehicle, assigns the selected space to the target vehicle, and transmits information on the assigned space and the authentication information to the target vehicle (S54). Note that a series of these types of the processing will hereinafter also be referred to as the "matching processing". As information that is used to identify the target vehicle, the authentication information is kept by the charging station 20 and the target vehicle until the target vehicle leaves the charging station 20.

Note that, as described above, when receiving the entry request operation by the user, the charging station 20 brings the entrance gate 24 into the opened state. In this way, the entry of the target vehicle to the charging station 20 is permitted. As will be described below, when entering the charging station 20 and approaching the assigned space, the contactless charged vehicle 10 transmits a parking request in the assigned space to the charging station 20.

When receiving the parking request in the assigned space from the target vehicle, the charging station 20 brings the entry prevention plate in the assigned space into the stored state (S56). In this way, the entry of the target vehicle to the assigned space is permitted. Note that the charging station 20 maintains the entry prevention plates in the empty spaces other than the assigned space in the restricting states. For this reason, the target vehicle is only permitted to enter the assigned space and is restricted from entering the other empty space. In this way, the target vehicle can appropriately be parked in the assigned space.

Note that, when the target vehicle is the normal vehicle, the charging station 20 does not receive the use request from the target vehicle, and thus the processing in S52 onward is not executed. Accordingly, the management device 22 maintains the entry prevention plate provided in the empty space in the restricting state. In this way, the normal vehicle is restricted from entering the empty space.

Next, a description will be made on the one example of the processing procedure executed by the contactless charged vehicle 10 (the controller 15). The contactless charged vehicle 10 determines whether the signal broadcast by the charging station 20 has been received (S10). If the signal broadcast by the charging station 20 has not been received (NO in S10), the contactless charged vehicle 10 skips the processing in S12 onward and terminates the processing.

If the signal broadcast by the charging station 20 has been received (YES in S10), the contactless charged vehicle 10 analyzes the received signal and determines whether the empty space is available in the charging station 20 (S12). If the empty space is unavailable in the charging station 20 (NO in S12), the contactless charged vehicle 10 skips the processing in S14 onward and terminates the processing.

If the empty space is available in the charging station 20 (YES in S12), the contactless charged vehicle 10 transmits the use request to the charging station 20 and, as a reply, receives the above-described empty space information from the charging station 20 (S14). As described above, the empty space information includes the information such as the guide map, on which the locations of all of the empty spaces are indicated, the maximum transmission power, and the charging fee per unit time.

The contactless charged vehicle 10 computes estimates of a charging time and the charging fee that are required for the contactless charging on the basis of the empty space information, identifies the recommended parking space (hereinafter also referred to as a "recommended space") among the empty spaces, and shows information on the recommended space and the estimates of the charging time and the charging fee on the display of the HMI device 14 (S16). At this time, instead of showing the location of the recommended space only, the contactless charged vehicle 10 shows the locations of all of the empty spaces on the display of the HMI device 14.

In this embodiment, the contactless charged vehicle 10 preferentially identifies the parking space that is suitable for the maximum received power of the power receiving device 11 as the recommended space. More specifically, the contactless charged vehicle 10 identifies the empty space where the installed power transmission device has the maximum transmission power that is equal to or higher than the maximum received power of the power receiving device 11 and that is the closest to the maximum received power as the recommended space. A reason for recommending the power transmission device that has the maximum transmission power equal to or higher than the maximum received power is because this allows charging with the maximum received power and the charging time required for the contactless charging is shortened. A reason for recommending the power transmission device that has the maximum transmission power closest to the maximum received power is because a radius of the primary-side coil and a radius of the secondary-side coil have near values, and power transmission/reception efficiency is increased.

For example, when the maximum received power of the power receiving device 11 is the predetermined value P1, a priority order of the spaces as being identified as the recommended space is: (i) the parking spaces PSa, PSb where the maximum transmission power is the predetermined value P1; (ii) the parking spaces PSc, PSd where the maximum transmission power is the predetermined value P2 (P2>P1); and (iii) the parking space PSe where the maximum transmission power is the predetermined value P3 (P3>P2). Note that, when the plurality of recommended spaces is identified, all of the plurality of recommended spaces may be shown on the display, or any one of the recommended spaces (for example, the nearest recommended space) may only be shown on the display.

Thereafter, the contactless charged vehicle 10 determines whether selection of the parking space is completed (S18). For example, when such an operation that the user selects any one of the empty spaces shown on the display of the HMI device 14 is performed, the contactless charged vehicle 10 determines that the selection of the parking space is completed. Note that the parking space is not necessarily selected by the user but, for example, the contactless charged vehicle 10 (the controller 15) may automatically select one of the recommended spaces.

If the selection of the parking space is incomplete (NO in S18), the processing returns to S18, and the contactless charged vehicle 10 waits until the selection of the parking space is completed. Note that, when the selection of the parking space is incomplete even after a lapse of a specified time, the processing may forcibly be terminated.

If the selection of the parking space is completed (YES in S18), the contactless charged vehicle 10 transmits information on the selected parking space (the selected space) to the charging station 20 (S19). In this way, as described above, the charging station 20 executes the matching processing (S54).

The contactless charged vehicle 10 receives information on the assigned parking space (the assigned space) by the matching processing and the authentication information (S20). At this time, in the contactless charged vehicle 10, the location of the assigned space and the own vehicle location identified by the GPS are shown on the display of the HMI device 14. Thus, while checking the display of the HMI device 14, the user can move the contactless charged vehicle 10 to the assigned space.

Thereafter, the contactless charged vehicle 10 determines whether the contactless charged vehicle 10 has approached the assigned space (S22). For example, when a difference between the own vehicle location identified by the GPS and the location of the assigned space becomes shorter than a predetermined value, the contactless charged vehicle 10 determines that the contactless charged vehicle 10 has approached the assigned space.

If the contactless charged vehicle 10 has not approached the assigned space (NO in S22), the processing returns to S22, and the contactless charged vehicle 10 waits until the contactless charged vehicle 10 approaches the assigned space. Note that, when the contactless charged vehicle 10 does not approach the assigned space after a lapse of a specified time, the contactless charged vehicle 10 may request the charging station 20 to cancel matching of the contactless charged vehicle 10 and the assigned space and then forcibly terminate the processing.

If the contactless charged vehicle 10 has approached the assigned space (YES in S22), the contactless charged vehicle 10 transmits the parking request in the assigned space (a signal to request cancellation of entry restriction to the assigned space by the entry prevention plate) to the charging station 20 (S24). In this way, as described above, the charging station 20 brings the entry prevention plate, which is installed in the assigned space, into the stored state (S56).

Figure 3:
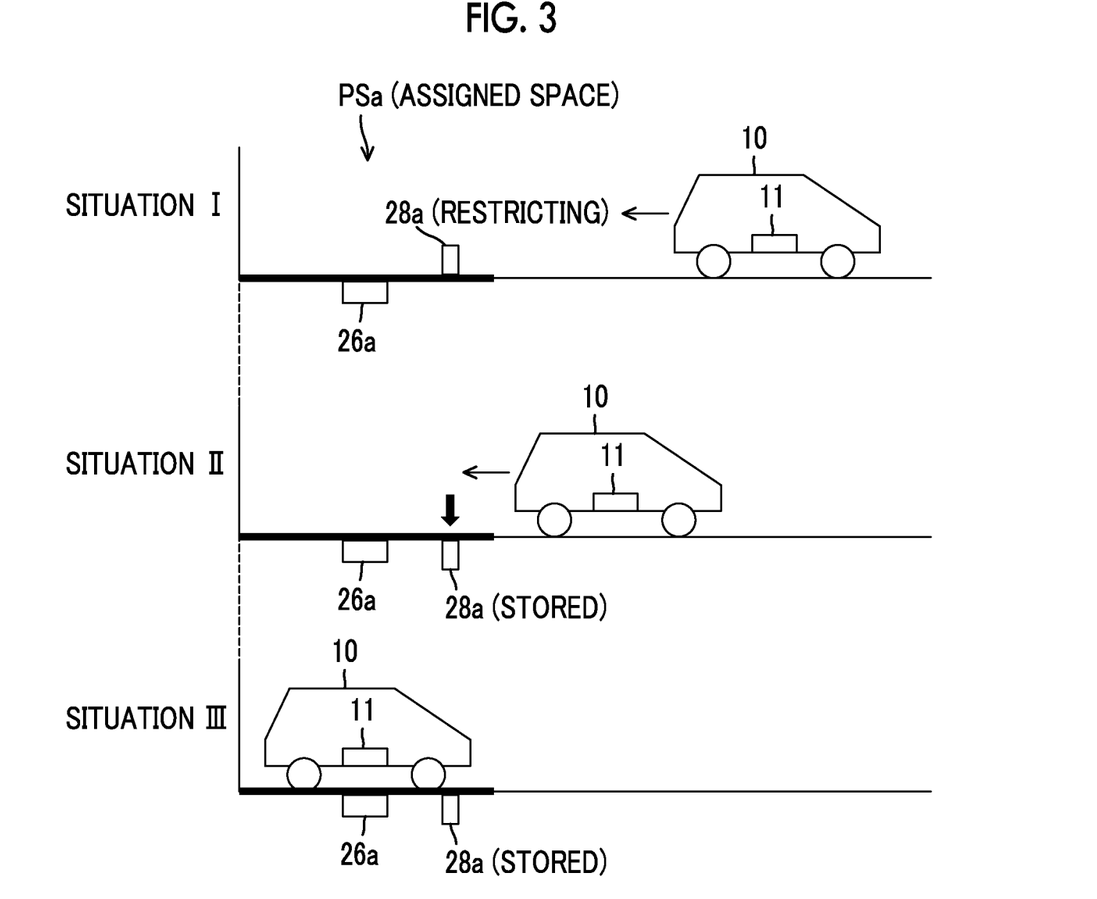
FIG. 3 is a view of one example of a state change of an entry prevention plate.

FIG. 3 is a view of one example of a state change of the entry prevention plate, which is provided in the assigned space to the contactless charged vehicle 10. In FIG. 3, a case where the assigned space to the contactless charged vehicle 10 is the parking space PSa is exemplified. A situation I in FIG. 3 shows a state where the contactless charged vehicle 10 is away from the parking space PSa. A situation II in FIG. 3 shows a state where the contactless charged vehicle 10 approaches the parking space PSa. A situation III in FIG. 3 shows a state where the contactless charged vehicle 10 is parked in the parking space PSa.

As shown in the situation I in FIG. 3, when the contactless charged vehicle 10 is away from the parking space PSa, the entry prevention plate 28*a* is projected above the road surface of the parking space PSa and is maintained in the restricting state to physically restrict the entry of the vehicle. In this way, parking of another vehicle in the parking space PSa is inhibited until the contactless charged vehicle 10 approaches the parking space PSa.

As shown in the situation II in FIG. 3, when the contactless charged vehicle 10 approaches the parking space PSa, the entry prevention plate 28*a* is stored in the space below the road surface of the parking space PSa and is switched to the stored state where the entry of the vehicle is permitted. In this way, as shown in the situation III in FIG. 3, the contactless charged vehicle 10 can be parked in the parking space PSa for the contactless charging.

Figure 4:
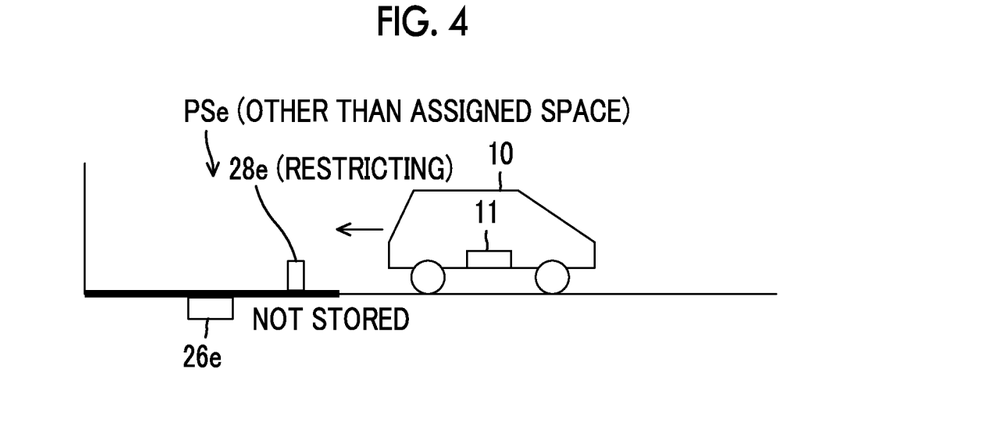
FIG. 4 is a view of one example of a state of the entry prevention plate.

FIG. 4 is a view of one example of a state of the entry prevention plate 28*e* when the contactless charged vehicle 10 approaches the parking space PSe as the empty space other than the assigned space. As shown in FIG. 4, when the contactless charged vehicle 10 approaches the parking space PSe, which is not the assigned space, the entry prevention plate 28*e*, which is provided in the parking space PSe, is maintained in the restricting state. Accordingly, the entry of the contactless charged vehicle 10 to the empty space other than the assigned space is restricted.

In addition, when the normal vehicle approaches any of the parking spaces, similar to the state shown in FIG. 4, the entry prevention plate, which is provided in each of the parking spaces, is not stored but is maintained in the restricting state. Accordingly, the entry of the normal vehicle to any of the parking spaces is restricted.

As it has been described so far, the charging station 20 (the management device 22) according to this embodiment assigns one of the empty spaces to the target vehicle when the target vehicle is the contactless charged vehicle 10. Then, at timing at which the target vehicle approaches the assigned space, the charging station 20 brings the entry prevention plate of the assigned space into the stored state and thereby permits the entry of the target vehicle to the assigned space.

On the other hand, when the target vehicle is the normal vehicle, the charging station 20 maintains the entry prevention plate, which is provided in each of the empty spaces, in the restricting state and thereby restricts the entry of the normal vehicle to the parking space. In this way, the parking spaces PSa to PSe where the power transmission devices 26*a* to 26*e* are respectively arranged can be used by the contactless charged vehicle 10 that uses the power transmission devices 26*a* to 26*e* instead of the normal vehicle that does not use the power transmission devices 26*a* to 26*e*. As a result, the parking spaces PSa to PSe in the charging station 20 can efficiently be used.

The above-described embodiment may be modified as follows, for example.

In the above-described embodiment, the entry of the normal vehicle to the parking spaces PSa to PSe is restricted by maintaining the entry prevention plates 28*a* to 28*e* in the restricting states.

However, means (the restriction device) for restricting the entry of the normal vehicle to the parking spaces PSa to PSe is not limited to that using the entry prevention plates 28*a* to 28*e*. For example, when the target vehicle is the normal vehicle, the entrance gate 24 may be maintained in the closed state. In this way, the entry of the normal vehicle to the charging station 20 is also restricted, and thus the entry of the normal vehicle to the parking spaces PSa to PSe is indirectly restricted. In addition, the entry may be restricted by both of the entry prevention plates 28*a* to 28*e* and the entrance gate 24.

In addition, the entry prevention plates 28*a* to 28*e*, which have been described in the above-described embodiment, physically restrict the entry of the vehicle to the parking spaces PSa to PSe.

However, the means (the restriction device) for restricting the entry of the vehicle is not limited to that for physically restricting the entry of the vehicle. For example, a device that generates a warning image or warning sound may be provided near the entry of the charging station 20 or in each of the parking spaces, and the user of the normal vehicle may be warned by the device that the entry of the normal vehicle is restricted. In this way, it is also expected that the user of the normal vehicle who has noticed the warning refrains from using the charging station 20.

In the above-described embodiment, at the timing at which the contactless charged vehicle 10 approaches the assigned space, the entry prevention plate, which is installed in the assigned space, is brought into the stored state.

However, timing at which the entry prevention plate is brought into the stored state is not limited to the timing at which the contactless charged vehicle 10 approaches the assigned space. For example, at timing at which the charging station 20 completes the matching processing (S54) by receiving the information on the selected space (a signal to request cancellation of entry restriction to the selected space by the entry prevention plate) from the contactless charged vehicle 10, the entry prevention plate, which is installed in the assigned space, may be brought into the stored state.

Figure 5:
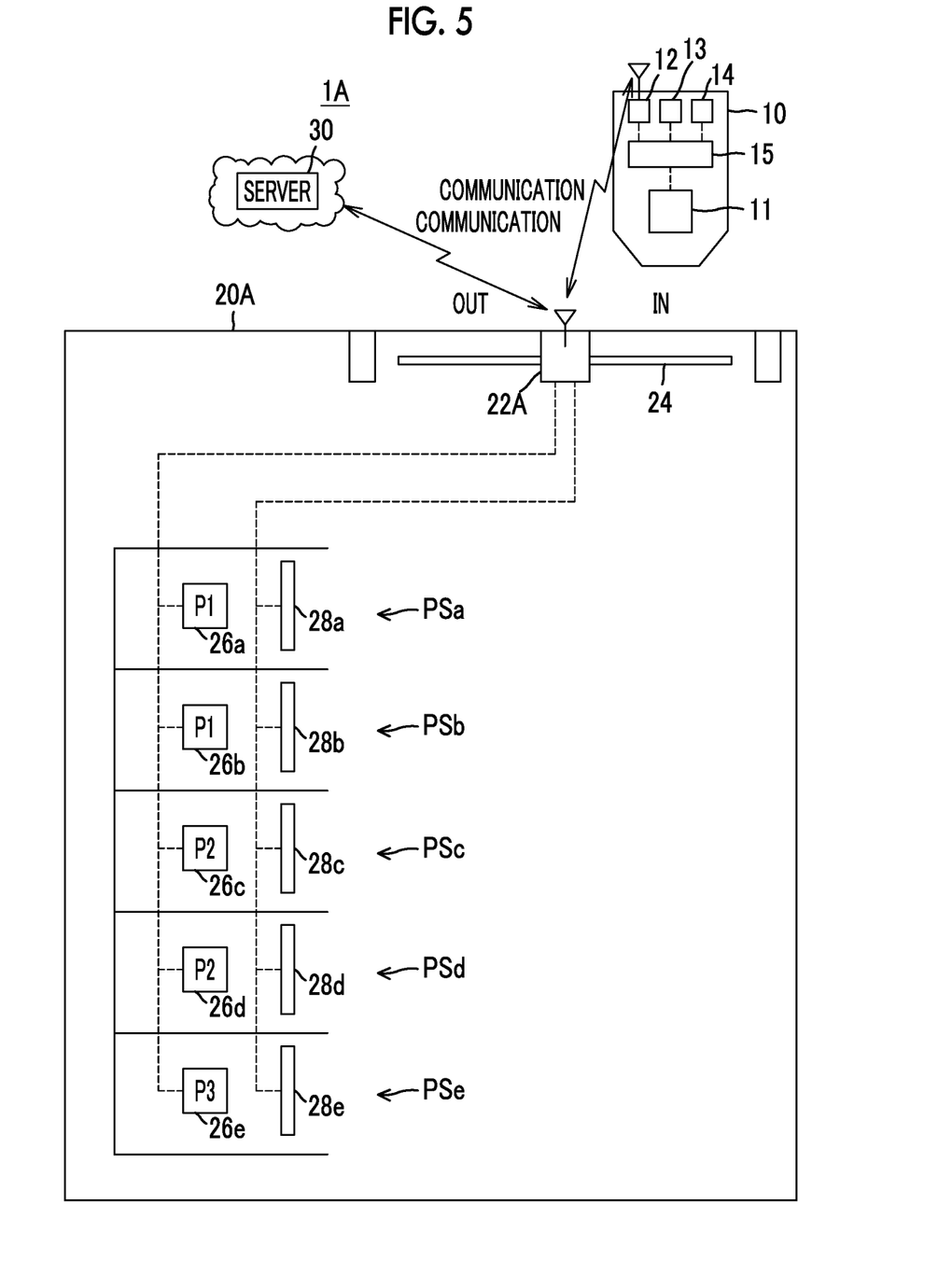
FIG. 5 is a schematic view (part 2) of an overall configuration of a contactless charging system according to a second embodiment.

Next, a description will be made on a second embodiment. FIG. 5 is a schematic view of an overall configuration of a contactless charging system 1A according to this second embodiment. The contactless charging system 1A includes the contactless charged vehicle 10, a charging station 20A, and a cloud server 30. The cloud server 30 is one example of an external server. The contactless charged vehicle 10 is the same as the contactless charged vehicle 10 in the above-described first embodiment.

In the charging station 20A, the management device 22, which is provided in the charging station 20 by the above-described first embodiment, is changed to a management device 22A. The management device 22A has a function of communicating with the cloud server 30 in addition to the functions of the management device 22. Because rest of the configuration of the charging station 20A is the same as that of the charging station 20 by the above-described first embodiment, the detailed description thereon will not be repeated.

The cloud server 30 is connected to various terminals such as a vehicle and a computer having a communication function via the Internet and collects peripheral information of the charging station 20A from these terminals. The peripheral information of the charging station 20A is information that is used to predict a parking use rate (a rate of the used spaces to the total parking spaces) in the charging station 20A, and, for example, includes information on a rate of the contactless charged vehicles and the normal vehicles that travel in a peripheral area of (an area within a specified distance from) the charging station 20A, and the like. For example, in response to a request by the charging station 20A, the cloud server 30 provides the charging station 20A with the peripheral information of the charging station 20A.

In accordance with the peripheral information obtained from the cloud server 30, the management device 22A of the charging station 20A predicts the parking use rate of the charging station 20A in a period from current time to a lapse of a specified time. When a predicted value of the parking use rate is lower than a threshold, the management device 22A permits the use of the parking space by the normal vehicle.

Figure 6:
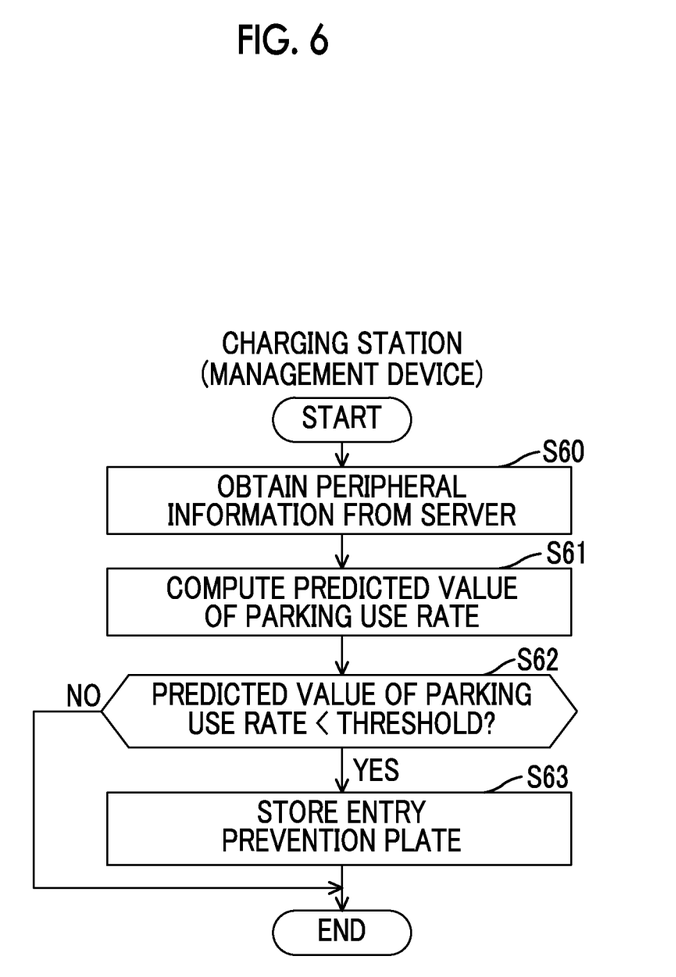
FIG. 6 is a flowchart of one example of a processing procedure executed by a charging station.

FIG. 6 is a flowchart of one example of a processing procedure executed by the charging station 20A (the management device 22A) using the peripheral information obtained from the cloud server 30.

The charging station 20A obtains the peripheral information of the charging station 20A from the cloud server 30 (S60). As described above, the peripheral information of the charging station 20A includes the information on the rate of the contactless charging vehicles and the normal vehicles that travel in the peripheral area of the charging station 20A, and the like.

In accordance with the peripheral information obtained from the cloud server 30, the charging station 20A computes the predicted value of the parking use rate in the period from the current time to the lapse of the specified time (S61). For example, the charging station 20A computes the predicted value of the parking use rate to be a smaller value as the rate of the contactless charged vehicles that travels in the peripheral area is reduced.

The charging station 20A determines whether the predicted value of the parking use rate is lower than the threshold (S62). If the predicted value of the parking use rate is equal to or higher than the threshold (NO in S62), that is, if it is predicted that a possibility of the empty spaces being used by the contactless charged vehicles in the future is high, the processing in S63 is skipped, and the charging station 20A terminates the processing. In this way, as described in the above first embodiment, the entry of the normal vehicle is restricted by the entry prevention plate.

On the other hand, if the predicted value of the parking use rate is lower than the threshold (YES in S62), that is, if it is predicted that the possibility of the empty space being used by the contactless charged vehicle in the future is low, the charging station 20A brings the entry prevention plates in all of the empty spaces into the stored states regardless of whether the target vehicle is the contactless charged vehicle or the normal vehicle (S63). That is, the charging station 20A executes the processing (storage processing of the entry prevention plates in all of the empty spaces) in S63 of FIG. 6 in priority to the processing (storage processing of the entry prevention plate in the assigned space) in S56 that has been described in the above first embodiment by using FIG. 2. In this way, in addition to the contactless charged vehicle 10, the use of the empty space is permitted for the normal vehicle.

As it has been described so far, the charging station 20A (the management device 22A) according to this second embodiment computes the predicted value of the parking use rate in accordance with the peripheral information obtained from the cloud server 30. When the predicted value of the parking use rate is lower than the threshold, the charging station 20A brings the entry prevention plate of the empty space into the stored state. In this way, when it is predicted that the possibility of the empty space being used by the contactless charged vehicle in the future is low, in addition to the contactless charged vehicle 10, the normal vehicle can also use the parking space. As a result, the parking space in the charging station can further efficiently be used.

In addition, the above-described embodiments and the modified example thereof can appropriately be combined within the scope that technical contradictions do not occur.

It should be considered that the embodiments disclosed herein are illustrative in all respects and thus are not restrictive. The scope of the present disclosure is indicated not by the above description but by the claims, and intends to include all changes within meaning and the scope equivalent to the claims.

What is claimed is:

1. A charging station comprising:
a power transmission device configured to transmit power to a contactless charged vehicle without contact;
at least one parking space in which the power transmission device is arranged;
a restriction device configured to be switched between a first state and a second state, the first state being a state of restricting entry of a target vehicle to one of the charging station and the parking space, the second state being a state of permitting the entry of the target vehicle to the charging station and the parking space, and the target vehicle being a vehicle that attempts to be parked in the at least one parking space; and
a management device configured to control the restriction device, the management device being configured to control the restriction device to be the second state when the target vehicle is the contactless charged vehicle, and the management device being configured to control the restriction device to be the first state when the target vehicle is a vehicle other than the contactless charged vehicle,
the management device is configured to receive information that is used to predict a parking use rate as a ratio of used spaces to total parking spaces from a server located on outside of the charging station, the information includes a rate of contactless charged vehicles and vehicles other than contactless charged vehicles that travel in an area within a specified distance from the charging station,
the management device is configured to predict the parking use rate to be a smaller value as the rate of contactless charged vehicles that travel within the specified distance is reduced, and
the management device is configured to control the restriction device to be the second state regardless of whether the target vehicle is the contactless charged vehicle when the management device determines that the parking use rate predicted in accordance with the information from the server is lower than a predetermined value.

2. The charging station according to claim 1, wherein
the at least one parking space includes a plurality of parking spaces,
the restriction device is provided for each of the plurality of parking spaces,
the management device is configured to assign one of empty parking spaces among the plurality of parking spaces to the target vehicle when the target vehicle is the contactless charged vehicle,
the management device is configured to control the restriction device that is provided in the parking space assigned to the target vehicle to be the second state, and
the management device is configured to control the restriction device that is provided in the parking space other than the parking space assigned to the target vehicle among the empty parking spaces to be the first state.

3. A contactless charging system comprising:
a target vehicle that includes a contactless charged vehicle configured to receive power without contact; and
a charging station that includes a power transmission device, at least one parking space, a restriction device, and a management device, the target vehicle being a vehicle that attempts to be parked in the charging station,
the power transmission device being configured to transmit the power to the contactless charged vehicle without contact, and the power transmission device being arranged in the at least one parking space,
the restriction device being configured to be switched between a first state and a second state, the first state being a state of restricting entry of the target vehicle to one of the charging station and the parking space, and the second state being a state of permitting the entry of the target vehicle to the charging station and the parking space,
the management device being configured to control the restriction device, the management device being configured to control the restriction device to be the second state when the target vehicle is the contactless charged vehicle,
the management device being configured to control the restriction device to be the first state when the target vehicle is a vehicle other than the contactless charged vehicle,
the management device is configured to receive information that is used to predict a parking use rate as a ratio of used spaces to total parking spaces from a server located on outside of the charging station, the information includes a rate of contactless charged vehicles and vehicles other than contactless charged vehicles that travel in an area within a specified distance from the charging station,
the management device is configured to predict the parking use rate to be a smaller value as the rate of contactless charged vehicles that travel within the specified distance is reduced, and
the management device is configured to control the restriction device to be the second state regardless of whether the target vehicle is the contactless charged vehicle when the management device determines that the parking use rate predicted in accordance with the information from the server is lower than a predetermined value.

4. The contactless charging system according to claim 3, wherein
the at least one parking space includes a plurality of parking spaces,
the restriction device is provided for each of the plurality of parking spaces,
the management device is configured to assign one of empty parking spaces among the plurality of parking spaces to the target vehicle when the target vehicle is the contactless charged vehicle,
the management device is configured to control the restriction device that is provided in the parking space assigned to the target vehicle to be the second state, and
the management device is configured to control the restriction device that is provided in the parking space other than the parking space assigned to the target vehicle among the empty parking spaces to be the first state.

* * * * *